ered, Siegfried & Ryan

United States Patent

[11] 3,559,540

| [72] | Inventor | Arnold C. Sheldon<br>1187 Raymond Ave., St. Paul, Minn. 55108 |
|---|---|---|
| [21] | Appl. No. | 750,704 |
| [22] | Filed | Aug. 6, 1968 |
| [45] | Patented | Feb. 2, 1971 |

[54] HYDRAULIC ACTUATOR
7 Claims, 4 Drawing Figs.

[52] U.S. Cl. .................................... 92/163,
  92/168; 227/205
[51] Int. Cl. .................................... F16j 15/18
[50] Field of Search ............................ 92/168,
  163, 169, 170, 171; 308/238, 240; 277/205

[56] References Cited
UNITED STATES PATENTS

| 3,069,178 | 12/1962 | Rosen | 277/205 |
| 3,179,018 | 4/1965 | Rumsey | 92/125 |
| 2,888,879 | 6/1959 | Gaarder | 92/170X |
| 3,038,448 | 6/1962 | Corwin | 92/168X |
| 3,190,702 | 6/1965 | Flick | 277/205X |
| 3,334,549 | 8/1967 | Sheldon | 92/248 |
| 3,369,924 | 2/1968 | Duggins | 308/238 |
| 3,376,183 | 4/1968 | Flynn et al. | 308/238 |

*Primary Examiner*—Martin P. Schwadron
*Assistant Examiner*—Leslie J. Payne
*Attorney*—Schroeder, Siegfried & Ryan

ABSTRACT: A hydraulic actuator of the lineal type which comprises a cylinder and piston with an output shaft journaled in a head mounted in one end of the cylinder. The invention is directed to the mounting of a bearing relative to a dynamic seal and wiper seal in the head or shaft guide closing the end of the cylinder and the location of the same relative to journaled surfaces on the piston together with an adjustable mounting of the head within the cylinder.

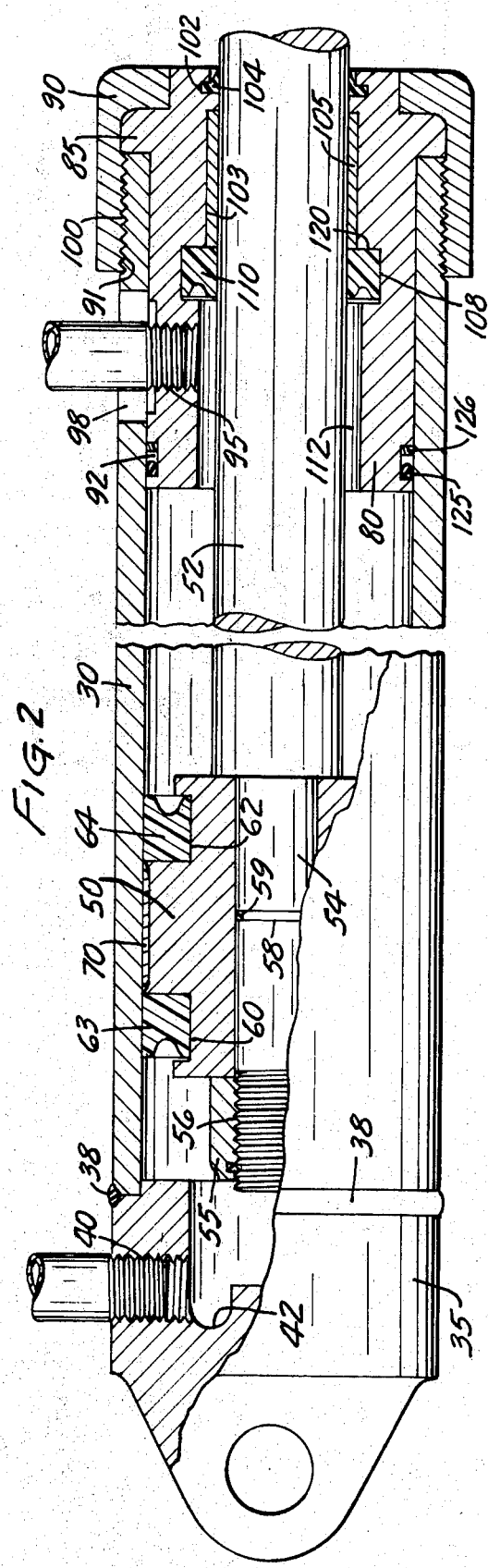
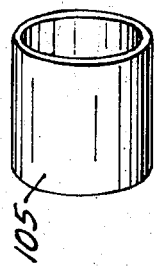
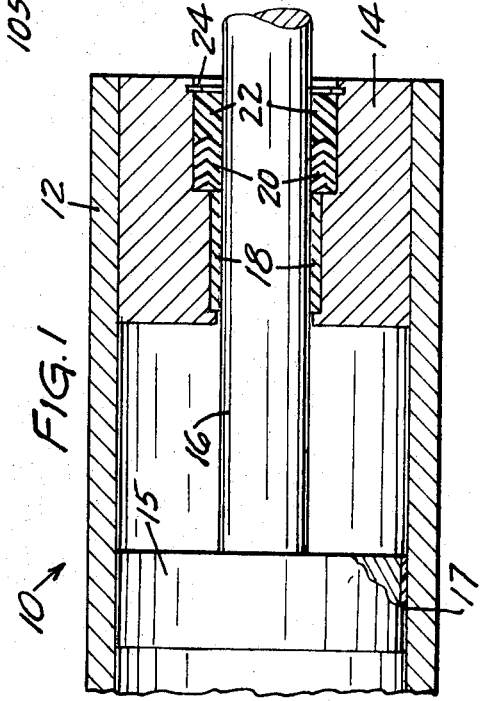
INVENTOR.
ARNOLD C. SHELDON

HYDRAULIC ACTUATOR

My invention relates to hydraulic actuators and more particularly to an improved hydraulic actuator of the lineal type which overcomes the problems of seal extrusion and leakage at the output shaft and scoring or galling of the same.

Hydraulic actuators of the lineal type are well known and in use in hydraulic systems. Problems relative to effective seals and fluid leakage within the cylinder around the pistons and at the actuating shaft have in the past and still do exist. Seal materials have now been perfected to a point where seals eliminate leakage. While such efficiency is desirable, an additional problem is created in that such a seal on the piston shaft causes the piston shaft bearing to run dry when the bearing is located outboard the seal. Under such conditions, the bearing will encounter undue wear and binding. In my prior U.S. Pat. No. 3,334,549 on a HYDRAULIC LINEAL ACTUATOR dated Aug. 8, 1967, the problem caused by installation of these seals in a double acting piston is solved by the creation of a self-lubricated bearing on the pistons. In the present invention, its broadest aspect is directed to the use of such sealing materials in the piston rod bearings and the location of such seals with respect to the piston rod bearing. In addition, with present day sophistication in hydraulic equipment and the application of the same to mobile units, environmental conditions are present which increase side loading on such actuators so as to destroy dynamic seal and cause wear in bearings, giving rise to leakage problems. In such hydraulic actuators of the lineal type, the piston rod bearings may be located on either the medial side or outboard from the piston rod dynamic seal. In normal prior installations, the piston rod bearing was placed medial to the dynamic seal in order to utilize the operating fluid for lubricating the bearing. With the bearing so mounted in the guide of the piston rod, effective side loading on the bearing was substantially increased and particularly subject to faulty installations so as to cause high comprehension loads on the bearings, resulting in scoring or galling of the piston rods and leaking cylinders. As a consequence of such high bearing loads resulting from the relatively short moment of force with the location of the bearing, the piston rod bearings wear out prematurely and assume an oval shape at its distal, internal periphery. With such wear on the piston rod, the dynamic seal associated therewith is similarly effected and takes a set which will permit leakage of the fluid in the cylinder to a point where the parts no longer maintain the leak-proof interference fit with the piston rod. Further, the manufacturing tolerances of such cylinders, pistons, rods and guide heads are always subject to the problems of concentricity. Slight misalignments in such parts introduce bearing loads causing scoring of the piston rod and when the bearing is installed medial to the dynamic seal, will cause extrusion of the dynamic seal into the space between the piston rod and the guide head since the seal is not adequately supported to prevent such extrusion. Where attempts have been made to solve this problem by placing the bearing outboard of the piston or at the distal end relative to the dynamic seal, the problem of extrusion of the dynamic seal and lubrication of the actuator bearing have resulted in similar leakage problems.

The present improved hydraulic actuator design is directed particularly to the elimination of the problem of seal extrusion and the prevention of scoring and galling on the piston rod to provide an improved hydraulic actuator suitable for mobile environmental applications where side loading, rough usage, vibration and similar conditions occur which normally result in excess wear on hydraulic actuators and leakage problems. The improved hydraulic actuator of my present design is applicable for extremely high pressures and solves the problem of concentricity of parts without introducing extreme manufacturing tolerances. In my improved hydraulic actuator design, the piston rod bearing is made of a dry lubricant material and is located outboard with respect to the piston rod dynamic seal. A definite relationship between the piston rod bearing and the dynamic seal is thereby provided which prevents extrusion of the seal, decreases the loading on the bearing and by being self-lubricated, eliminates the problem of scoring of the piston rod. In my improved hydraulic actuator, the improved bearing surface on the piston as described in my before-mentioned patent together with the improved location and type of piston rod bearing together with the mounting of the cylinder head within the cylinder, provides a structure in which these problems are eliminated. Thus, lower bearing loads are imposed on the piston rod bearing by increasing the distance between the piston bearing and piston rod bearing. Such a location of parts substantially eliminates the problem of compression of the piston rod dynamic seal such that it maintains concentricity with the rod for tight interference fit preventing leakage.

With the improved hydraulic actuator design the outboard face of the piston rod dynamic seal bears against a flat machine surface which includes an edge of the piston rod bearing so that extrusion of the seal into the space between the piston rod and piston rod bearing is prohibited. In addition, the use of the wiper seal outboard of the piston rod bearing insures cleaning of all debris from the piston rod before it enters the bearing. The bearing itself is inherently self-lubricated and therefore can operate completely satisfactorily in an essentially oil-free environment. With the improved hydraulic actuator design, the head assembly mounting the piston rod bearing which supports the piston rod is free to move within the cylinder barrel so that it can compensate for machining tolerances and center itself completely concentric to the axial center of the piston rod. Once so centered, it is securely positioned so that it will not, thereafter, move. In the improved hydraulic actuator, the static seal for the head within the cylinder is located close to the medial end of the head to eliminate the presence of operating fluids between the head and that portion of the cylinder outboard of the head static seal. This eliminates the tendency of bulging of the cylinder member under extreme operating conditions. In addition, the cylinder head is provided with a shoulder which definitely locates the head relative to the cylinder and prevents movement of the same relative thereto with the prevention of rotative forces applied to the head due to the porting to the cylinder which extends through the cylinder wall and head.

Therefore, it is the principal object of this invention to provide an improved hydraulic actuator of the lineal type which overcomes the problems of leakage and scoring of the piston rod.

Another object of this invention is to provide an improved hydraulic actuator particularly particularly applicable to mobile environmental conditions and high pressures which will withstand the effect of side loading without wear.

Another object of this invention is to provide in a hydraulic actuator of the lineal type an improved bearing location relative to dynamic and wiper seals which when combined with a seal on the piston and bearing surface incorporating therewith will provide long life and improved operation in a hydraulic actuator.

Another object of this invention is to provide an improved hydraulic actuator design which eliminates the problem of severe manufacturing tolerances by compensating for effects of misalignment between the cylinder supporting head and the piston rod and shaft supported by the same.

These and other objects of this invention will become apparent from a reading of the attached description together with the drawings wherein:

FIG. 1 is a schematic view of a prior art type hydraulic actuator showing the location of bearing and seal parts;

FIG. 2 is an elevation view, with parts broken away, of my improved hydraulic actuator;

FIG. 3 is a sectional view of the supporting cylinder head with the seals removed; and FIG. 4 is a perspective view of sleeve bearing utilized in my improved hydraulic actuator.

In FIG. 1 of the drawings is shown schematically a typical prior art application of bearings and seals in a hydraulic actuator to explain the problem of leakage and scoring of the piston rod. Thus, in FIG. 1, the hydraulic actuator, shown generally at 10, includes a cylinder barrel or member 12 which is broken at one extremity to indicate that it may be either a single or double ended actuator. The barrel or cylinder member 12 mounts a guide or cylinder head 14 in one extremity which may be secured thereto through suitable means (not shown). Positioned within the cylinder is the piston 15 having attached thereto through suitable means the piston rod of shaft 16 with the shaft extending through the head 14 to be supported and guided therein. For simplicity, fluid passages are omitted and the peripheral surface of the piston has a suitable bearing and seal surface 17 thereon. In the prior art designs, the bearing, indicated at 18, for supporting the piston rod 16 within the head 14 is normally mounted at the medial or inboard end of the head 14 adjacent the confines of the cylinder and the fluid pressures bear against the same such that the bearing 18 in most instances would be lubricated by slight leakage of the cylinder fluid around the bearing or between the bearing and the shaft. The piston rod dynamic seal, shown schematically at 20, would be positioned at the distal or outboard end of the head with a suitable adapter member or backing 22 bearing against the same to hold the dynamic seal in position and in contact with the shaft with the adapter being out of contact with the shaft and suitably secured in the head through a locking or snap ring means, such as is indicated schematically at 24.

Such prior art constructions are not suitable for high pressure and environmental conditions, such as side loading, caused either by external forces or misalignment of parts because of bearing wear which appears at the distal end of the bearing. This wear will effect the internal shape of the distal end of the bearing causing it to become elliptical and resulting in similar wear on the shaft to cause leakage at this point. Similarly, the piston rod dynamic seal, while being effective initially to prevent the flow of hydraulic fluid outside of the confines of the actuator, will wear because of insufficient backing causing extrusion of the seal to allow leakage around the piston rod. Bearing wear causes the seals to take a permanent set which will present a lack of friction fit and leakage at this point. The location of the piston rod bearing 18 in close proximity to the piston bearing 17 by positioning of the bearing 18 at the medial end of the head 14, greatly increases the forces applied thereto by side loading, vibrations and the like to present an increased problem of wear with resultant scoring of the shaft or piston rod and leakage of the actuator around the piston rod.

In my improved hydraulic actuator design these problems are overcome with the construction which is shown in FIGS. 2,3 and 4. The cylinder member of the improved hydraulic actuator of the lineal type is identified at 30 to be of uniform internal diametrical dimension and of sufficient wall thickness and strength as well as length to accommodate varying pressure and work applications. One end of the cylinder is closed by a head member, indicated at 35, which is sealed to the cylinder through suitable means such as welding, indicated at 38. The hydraulic actuator shown herein is of the double acting type with a port passage 40 positioned through the head 35 and with a suitable recess in the head, indicated at 42, communicating with the port passage to allow the flow of fluid into one extremity of the cylinder.

Positioned within the cylinder is a piston member 50 which is described and claimed in detail in my prior U.S. Pat. No. 3,334,549. The piston is mounted on a piston rod 52 or shaft which has a reduced end portion 54 such that the body of the piston bears against the shoulder on the rod and is held thereon through a suitable elastic stop duct 55 threaded onto a threaded end portion 56 of the rod. In addition, the reduced portion of the rod has a groove 58 in which is positioned a suitable seal ring 59 to seal the piston 50 on the rod. For the double acting cylinder, the piston has grooved sections 60, 62 therein in which are positioned cup-shaped or U-shaped dynamic seals 63, 64 respectively, with the seals being so positioned on the piston such that the dished face of the same face the area of the pressure at either side of the piston. Positioned in between the seals is a bearing surface, indicated at 70, which bearing surface extends completely between the seals and is in contact with the backs or rear surfaces of the same to define with that sidewall of the groove a true angular surface normal to the extent of the cylinder or perpendicular thereto to prevent extrusion of the dynamic seal into the area of the bearing. While I have shown this particular bearing and seal configuration for the piston rod with the present invention, similar structures which provide a bearing surface and a sealing surface between the piston and the cylinder wall may be employed.

The other end of the cylinder member, as shown in FIG. 2, is, as constructed, normally open and mounts the support and seals for the hydraulic actuator. It is in this area of design that the improvements of the present invention reside to overcome the problems of leakage, scoring of the piston rod shaft and breakdown of the bearing and seals. Positioned in this end of the cylinder is a head member 80 which at installation is free floating with respect to the cylinder member 30, that is not integrally formed therewith. The head member 80 performs the function of closing the end of the cylinder and mounts the bearing for the piston rod as well as the dynamic and static seals which close the end of the cylinder and insures seal between the moving parts. As shown in FIGS. 2 and 3, the head member 80 has a centrally located bore extending therethrough which is of a larger diametrical dimension than the outer diametrical dimension of the piston rod. In addition, this bore has a plurality of angular grooves or recesses extending from this central opening for the purposes to be later noted. The outer peripheral surface of the head member has an angular flange or shoulder 85 thereon near its outboard end which defined a shoulder section over which a securing cap or collar 90 is positioned in the assembly of the cylinder. In addition, the head member 80 has an angular groove 92 near the opposite extremity in which is positioned static seal, to be later defined. Extending transverse of the bore and positioned through the head is a tapped bore or port 95 defining the inlet fluid passage for the cylinder, which when the head is positioned in the end of the cylinder member abutting the same will coincide with an aperture 98 in the cylinder wall. The end of the cylinder has a threaded surface 91 which cooperates with an internal threaded surface 100 of the collar or cap member to secure the collar or cap on the cylinder member. Because of manufacturing tolerances, the head member 80 with its shoulder portion 85 thereon are made slightly smaller than the internal diametrical dimension of the end of the cylinder member 30 so that the head member will be substantially free floating, that is have a slight clearance in the order of several thousandths of an inch to enable the same to align the piston rod concentric with the cylinder member on installation.

The head member 80 is a machined part which, after the central bore 83 is positioned therein, will be internally machined to provide the plurality of recesses in which are positioned the sealing members and bearings, to be hereinafter defined. Thus, as shown in FIG. 2, the head has an internal recess facing on the central bore and indicated at 102 in which is positioned a wiper seal, indicated at 104, these being located adjacent the end of the head member or at the distal end of the same with respect to the piston 50. Adjacent the recess 102 which mounts the wiper seal is a recess 103 in which is positioned a sleeve type bearing 105 which is self-lubricating. Adjacent to and connected with the recess 103 is a recess or groove 108 which mounts the dynamic seal member 110 of the actuator. The dynamic seal member 110 is constructed from a material and is of a configuration which will prevent all leakage past the same. The sleeve bearing 105, which is positioned outboard of this seal member, must be of the self-lubricating type since there will be no leakage between the seal and the piston shaft. The installation of a self-lubricating bearing imposes a problem with respect to the dynamic seal member to insure that the seal member will not extrude out of the seal cavity. In my improved hydraulic actuator, the sleeve bearing is installed in the head member so as to be adjacent the dynamic seal and provide support or backing for the same to prevent such extrusion. As will be hereinafter explained, the edge of the sleeve bearing forms a part of the recess for the seal member 110 and provides an accurately machined surface against which the heel or back of the seal member will bear, with this surface extending directly down to the point where the bearing has contact with the piston rod so that no space is allowed for extrusion. The remaining portion of the bore is enlarged, as at 112, to provide a passage from the port 95 with which is communicates allowing the passage of working fluid into the confines of the cylinder member abutting one surface of the piston 50. This area is enlarged and may be utilized for the installation of cushions or suitable flow compensators in the head member if desired.

The location of the bearing 105 with respect to the bearing surface 70 on the piston is such that these bearing are as far removed as possible within the confines of the actuator to provide the greatest spacing between the bearings within a give hydraulic actuator for reducing the effect of side loading on the bearing 105. Thus, the moment of force caused by side forces on the piston rod 52 will be transmitted to the bearing 105 as a smaller force because of this increased distance from the distal end of the piston. In construction, the head member 80 is normally machined in a single operation, that is the internal recesses therein are constructed following the drilling of the general bore 82 therethrough. After the recess 104 is positioned in the head, the sleeve type bearing 105 is inserted and press fitted into the recess 103 to secure the bearing therein. The bearing is normally made slightly longer than its finished extent and in the machining of the recess 108 a portion of this bearing is cut off such that the distal side of the recess 108, as indicated at 120, will be flush and normal to the axis of the bore and the piston rod therein. By performing the machining of the recesses 102, 103, 108 and 112 in the same operation and the insertion of the bearing 105 before the final machining of the face 120, a true surface 120 is provided such that the seal member 110 therein will have a uniform surface to bear against and will eliminate the possibility of any space between the bearing 105 and piston rod 52 into which the seal member 110 can extrude.

In assembly, the groove 92 on the peripheral surface of the head member 80 will receive a static seal member or seal ring 125 which will be backed up by suitable teflon washer 126 to secure the same therein and provide a static seal between the outer periphery of the head member and the inner wall of the cylinder member 30. This is located forward or medial of the port openings 92 to insure that fluid under pressure will not be positioned behind the dynamic seal member 110 on the piston rod. Thus, there can be no problem of bulging or blunder-bussing under extremely severe operating conditions. The head member 80 itself, when assembled on the piston rod, will have the collar member 90 positioned over the shoulder portion 85 thereof to cause the shoulder portion to bear against the end of the cylinder member 30 and accurately position the head member in the end of the cylinder. The threaded coupling between the threaded surfaces 91 and 100 on the cylinder member and collar 90, respectively, will retain the collar on the cylinder member and the head member in this position. The clearance between the head member and the cylinder member allows for slight movement of the head assembly within the cylinder barrel so that it can compensate for machining tolerances and center itself completely concentric with the axial center line of the piston rod. Once it is so centered and the collar or cap secured thereon, the head member will be retained in this position, eliminating any possibility of side loading because of misalignment. The dynamic seal member 110 and the wiper seal 104 are preferably made of a polyurethane material and installed so that the back or bite portion of the same is against a true or flat surface with a cup shaped surface of the seal member 110 being positioned on the piston rod to be exposed to the pressure end of the cylinder. Similarly, the wiper seal 104 has its wiping surface positioned toward the external end of the head member to insure cleaning of the piston rod as it moves toward the confines of the actuator. Thus, the seal member 110 will spread with the application of pressure in the confines of the cylinder to form an effective static seal with respect to the head member and dynamic seal with respect to the piston rod. The bearing 105 is of the dry lubricant type since no fluid will flow past the dynamic seal to lubricate the same. This bearing may be made of any suitable material, and I have found that a type DU made by Garlock Medalla, Inc. of Cherry Hill, New York is extremely suitable for this purpose. This bearing is constructed on a steel plate upon which is embedded sintered bronze and lead intermixed, over which is positioned a coating of teflon to completely cover the metallic surface. The flat plate is then bent or formed into the sleeve bearing and in the machining of the groove 108, a portion of the teflon forming the edge surface 120 will flow and effectively fill this area to provide a true flat surface against which the seal member 110 will bear. Thus, the sleeve bearing 105 is located in the head member as far removed from the piston as possible to minimize effects of the side loading or force thereon, such that the bearing will not be deformed by wear and will retain and support the piston rod for extreme long actuator life. Similarly, the bearing, when so positioned and constructed and because of its inherent lubrication, will retain its shape and eliminate the possibility of deforming of the seal members to cause leakage at this point. While I have shown a particular shape of dynamic seal, it will be understood that other suitable seal ring shapes may be employed for this purpose. The close tolerance between the piston rod and the sleeve bearing will eliminate the possibility of extrusion of the seal material to cause disintegration of the seal.

In operation, my improved hydraulic actuator is conventional except for its extreme long life, ruggedness and capability of withstanding environmental conditions which introduce the wear caused by side loadings and vibration thereon. The improved hydraulic actuator, because of the arrangement of parts, reduces the bearing loading by providing a longer distance between the piston bearing and the piston rod bearing. This will eliminate the possibility of bearing deformation and distortion or compression of the piston rod seals. By positioning the seal members against the flat surface, the possibility of extrusion of the seal material into the space between the piston rod and bearing is eliminated. This will eliminate the possibility of scoring of the rod and introduction of a leakage area at this point. By positioning the head member in the cylinder member and accurately locating the same, alignment of the bearing and head member and hence the piston rod with respect to the axis of the piston is insured. The introduction of a self-lubricated bearing behind the dynamic seal in an essentially fluid free environment eliminates the problem of leakage at this point and insures proper journaling of the piston rod for long life and maintenance free operation. Further, by confining the fluid within the cylinder behind the dynamic seal or inboard of the same, the problem of bulging of the cylinder or blunder-bussing is eliminated. In addition, the alignment of the aperture in the cylinder with the port in the head member and introduction of a connecting tap or pipe thereto will prevent relative rotative movement between the head member and the cylinder to insure that the cap or collar 90 will be retained in the threaded coupling with the end of the cylinder for positive location thereon. Thus, no rotative forces can be imposed on the head member or collar and, consequently, it will remain in tight relationship with the cylinder member.

In considering this invention, it should be remembered that the present disclosure is intended to be illustrative only and the scope of the invention should be determined by the appended claims.

I claim:

1. A hydraulic actuator comprising:

a cylinder member closed at one extremity;

a head member positioned in part in an open extremity of the cylinder member;

said head member having a central bore therethrough with a plurality of grooved recesses extending from the surface of the bore and distributed along the extent of the same;

a piston mounted on a shaft and positioned in the cylinder member with the shaft extending through the bore of the head member;

said piston having a bearing surface and sealing means positioned on the peripheral surface of the piston to engage on the internal wall on the cylinder member;

means adapted to introduce a motive fluid into one end of the cylinder member to be effective on one side of said piston including a port in the head member leading to one of the plurality of recesses common to the bore of the head member within the confines of the cylinder member and to an aperture in the cylinder member aligned with the port;

said port being adapted to receive a fitting to provide a passage into the cylinder member which prevents rotation of the head member within the cylinder member;

a first seal positioned in one of the recesses of the bore of the head member adjacent the outside surface thereof and remote from the cylinder member and bearing on the shaft;

a self lubricated sleeve bearing fitted into another of the recesses in the bore of the head member located inboard of the first seal and adapted to receive and journal the piston shaft clear of the head member;

a second seal formed of a material and into a configuration which does not permit leakage located in a further of the recesses of the bore and positioned medial to said sleeve bearing and abutting one edge of the sleeve bearing to be supported in part by the same;

said further recess for the second seal having a side which aligns with the edge of the sleeve bearing and is normal to the extent of the shaft;

said cylinder member having a threaded peripheral surface at one extremity thereof;

said head member including an external flange on the periphery near one extremity of the same; and including a cap member having a threaded interior surface and an aperture in the one end of the same fitted over the shaft and the flange of the head member and coupling with the threaded surface of the cylinder member to secure the head member in the end of the cylinder member.

2. The hydraulic actuator of claim 1 in which the cap means at the aperture has dimensions which permit adjustment of the head member within the cylinder member to allow alignment of the pistons and shaft with the cylinder member.

3. A hydraulic actuator comprising:

a cylinder member closed at one extremity;

a head member positioned in part in an open extremity of the cylinder member;

said head member having a central bore therethrough with a plurality of grooved recesses extending from the surface of the bore and distributed along the extent of the same;

a piston mounted on a shaft and positioned in the cylinder member with the shaft extending through the bore of the head member;

said piston having a bearing surface and sealing means positioned on the peripheral surface of the piston to engage on the internal wall on the cylinder member;

means adapted to introduce a motor fluid into the cylinder member to at least one side of the piston;

a first seal positioned in one of the recesses of the bore of the head member adjacent the outside surface thereof and remote from the cylinder member and bearing on the shaft;

a self lubricated sleeve bearing fitted into another of the recesses in the bore of the head member located inboard of the first seal and adapted to receive and journal the piston shaft clear of the head member; a second seal formed of a material and into a configuration which does not permit leakage located in a further of the recesses of the bore and positioned medial to said sleeve bearing and abutting one edge of the sleeve bearing to be supported in part by the same;

means for securing the head member to the end of the cylinder member, and including a passage in the closed end of the cylinder member and a pair of dynamic seal members forming the sealing means positioned on the peripheral surface of the piston to either side of the bearing surface on the piston.

4. The hydraulic actuator of claim 6 and including an additional seal member on the peripheral edge of the head member positioned within the cylinder member and sealing the head member to the inner wall of the cylinder member.

5. The hydraulic actuator of claim 3 in which the sleeve bearing is made of a steel backing material coated on the inner surface with a sintered bronze material and powered lead material and covered with a teflon coating to be exposed to the shaft for supporting the same.

6. The hydraulic actuator of claim 3 in which the first seal member is a wiper seal and the second seal member abutting the edge of the sleeve bearing is a static and dynamic seal preventing flow of motive fluid in the hydraulic cylinder from passing through the head member and along the shaft to the sleeve bearing with the sleeve bearing having a dry lubricant and acting as the sole support for the shaft in the head member.

7. The hydraulic actuator of claim 3 in which the head member has the sleeve bearing disposed adjacent the second seal member with the recesses and the seal members being concentric and in which the sleeve bearing is press fitted into said another recess in the head member.